Jan. 18, 1966   A. ANDERSON   3,229,804
LOADER AND FEEDER MECHANISM
Filed April 25, 1963   5 Sheets-Sheet 1
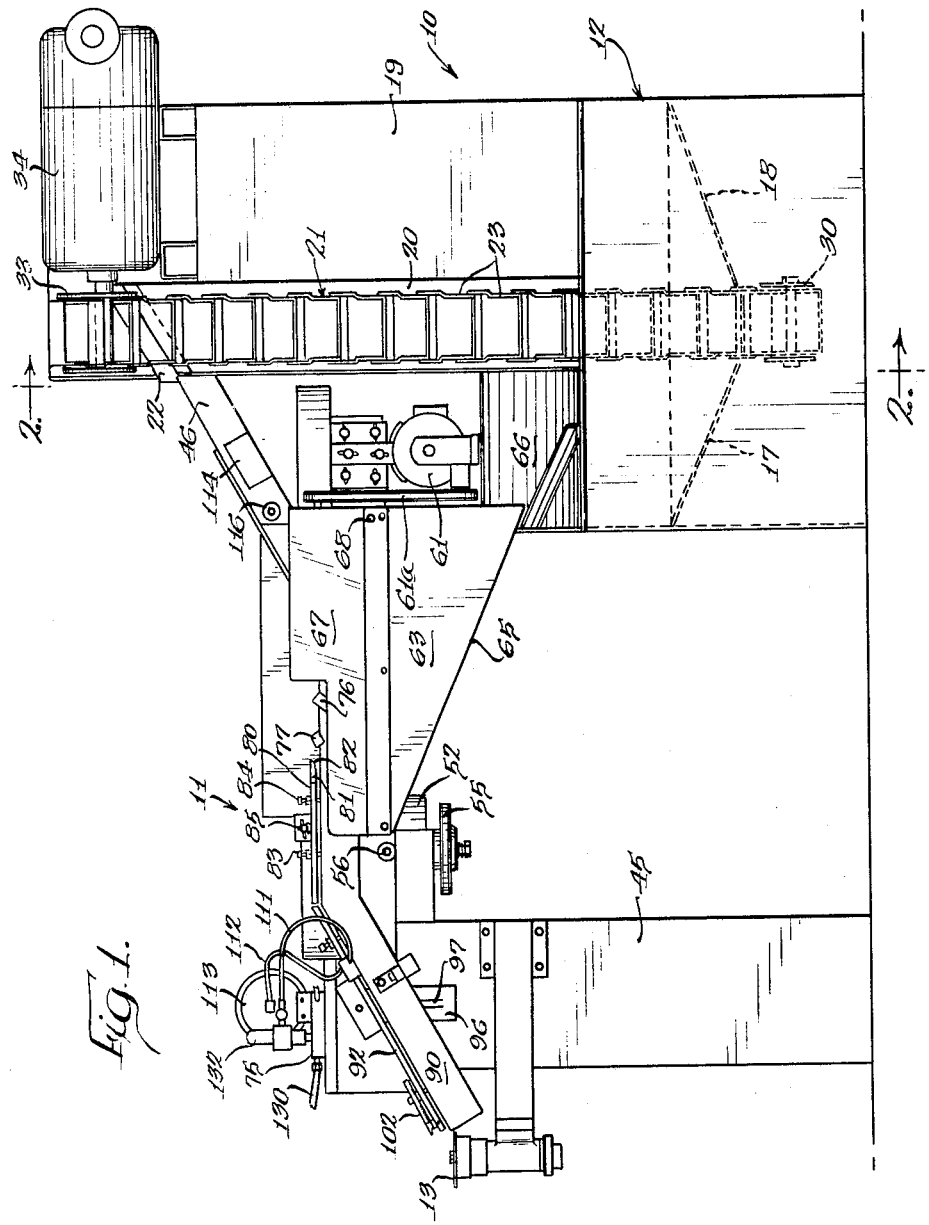
INVENTOR:
Axel Anderson
BY
Hofgren, Wegner, Allen, Stellman & McCord
Attys

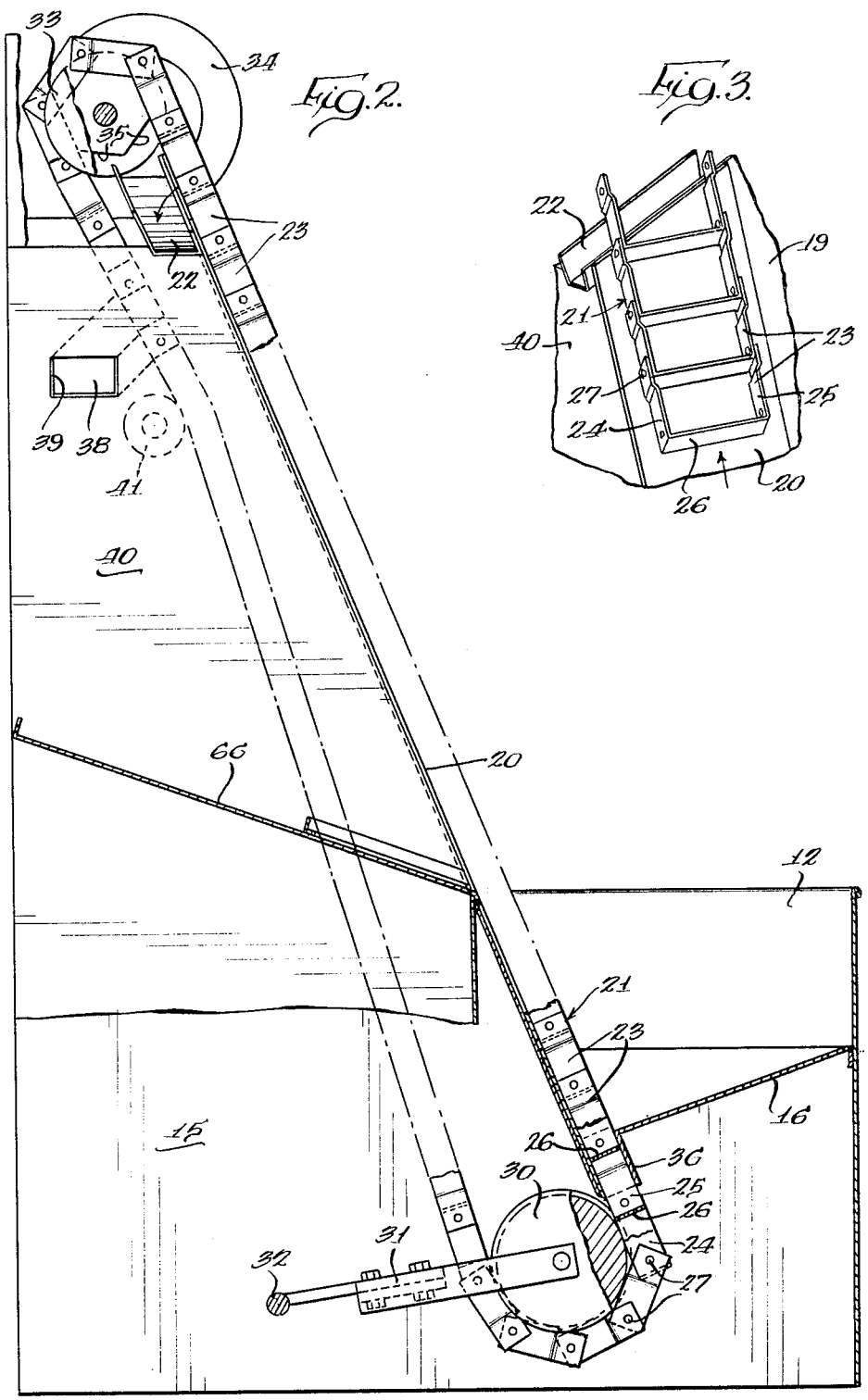

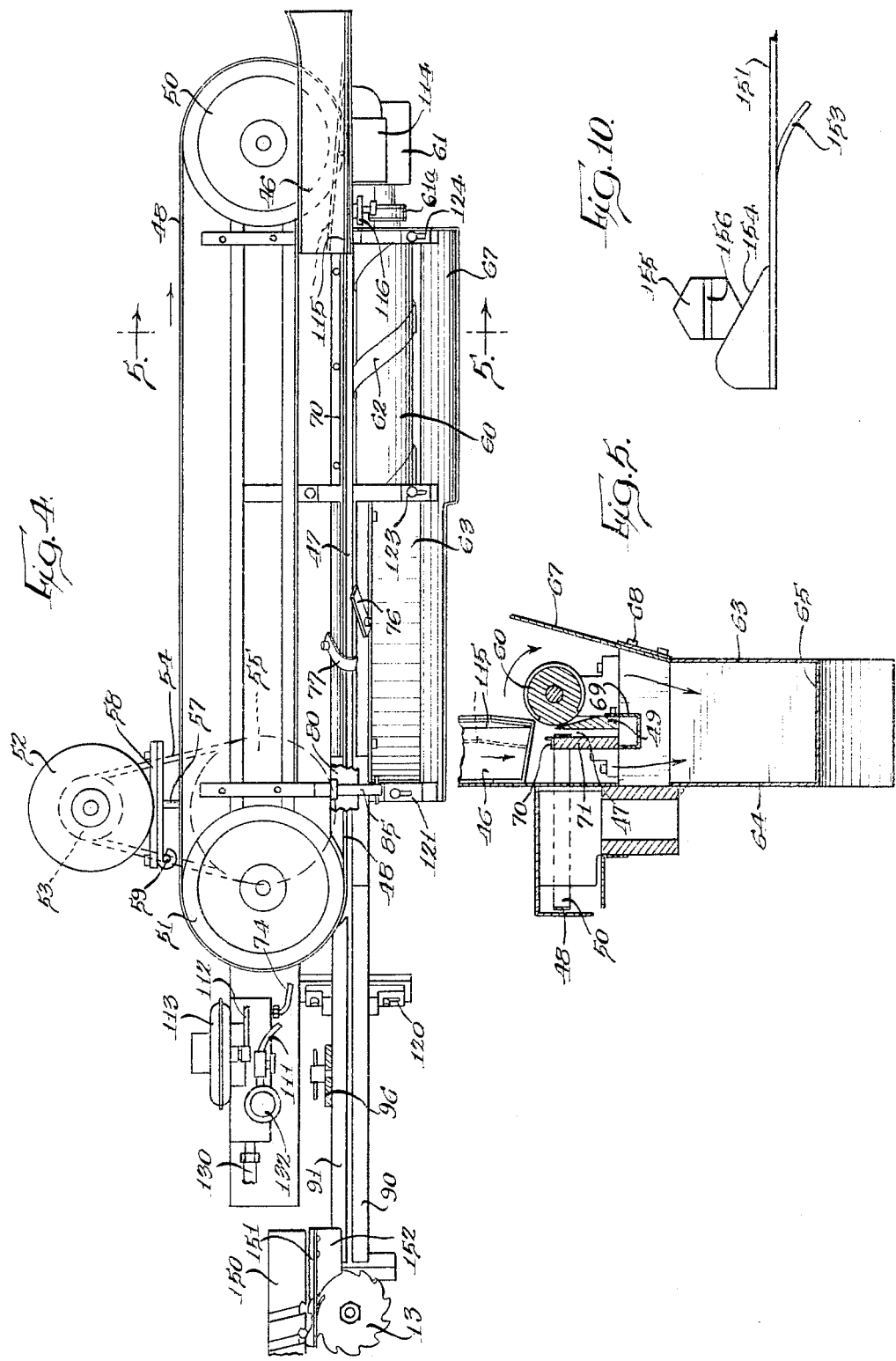

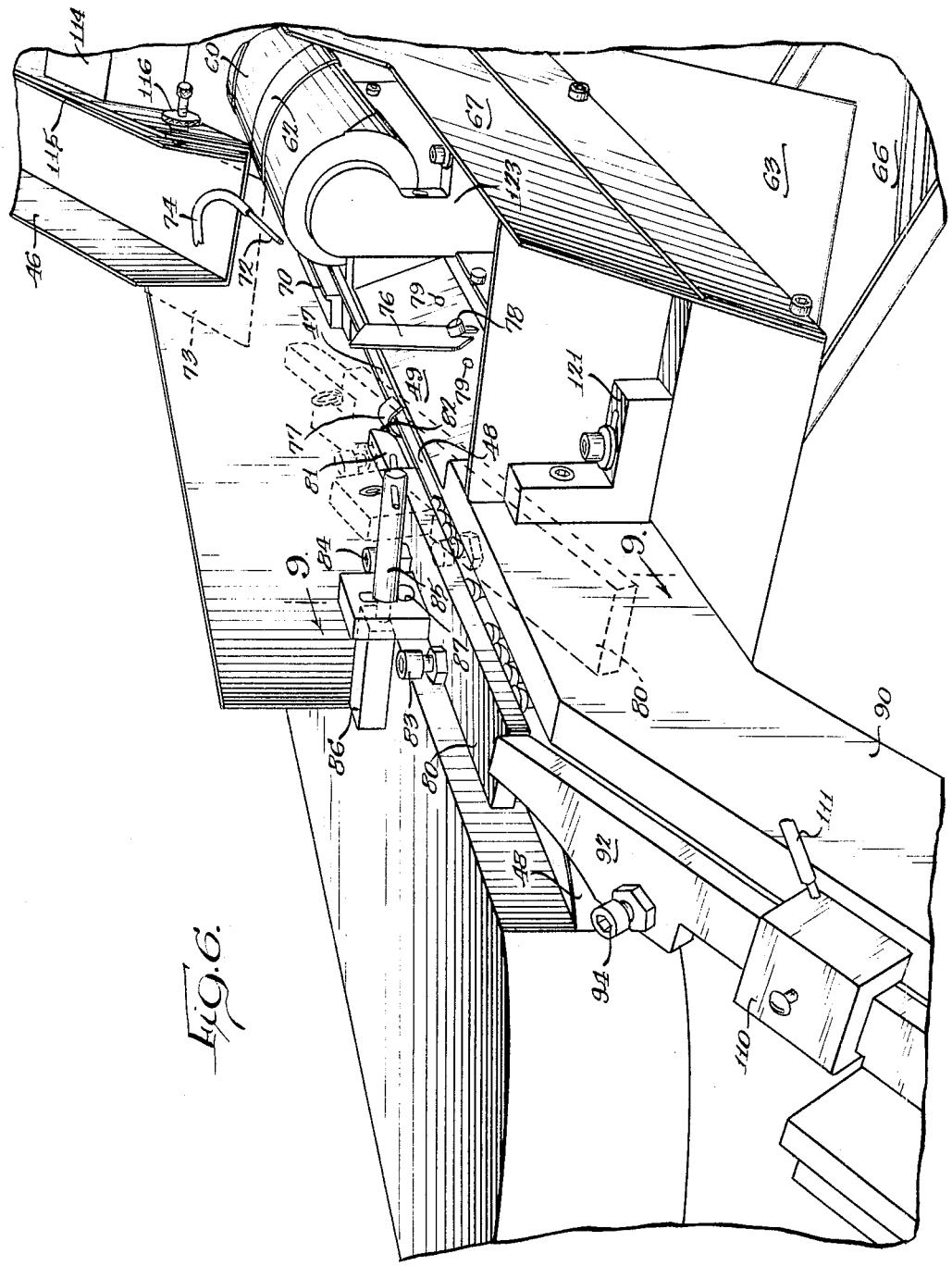

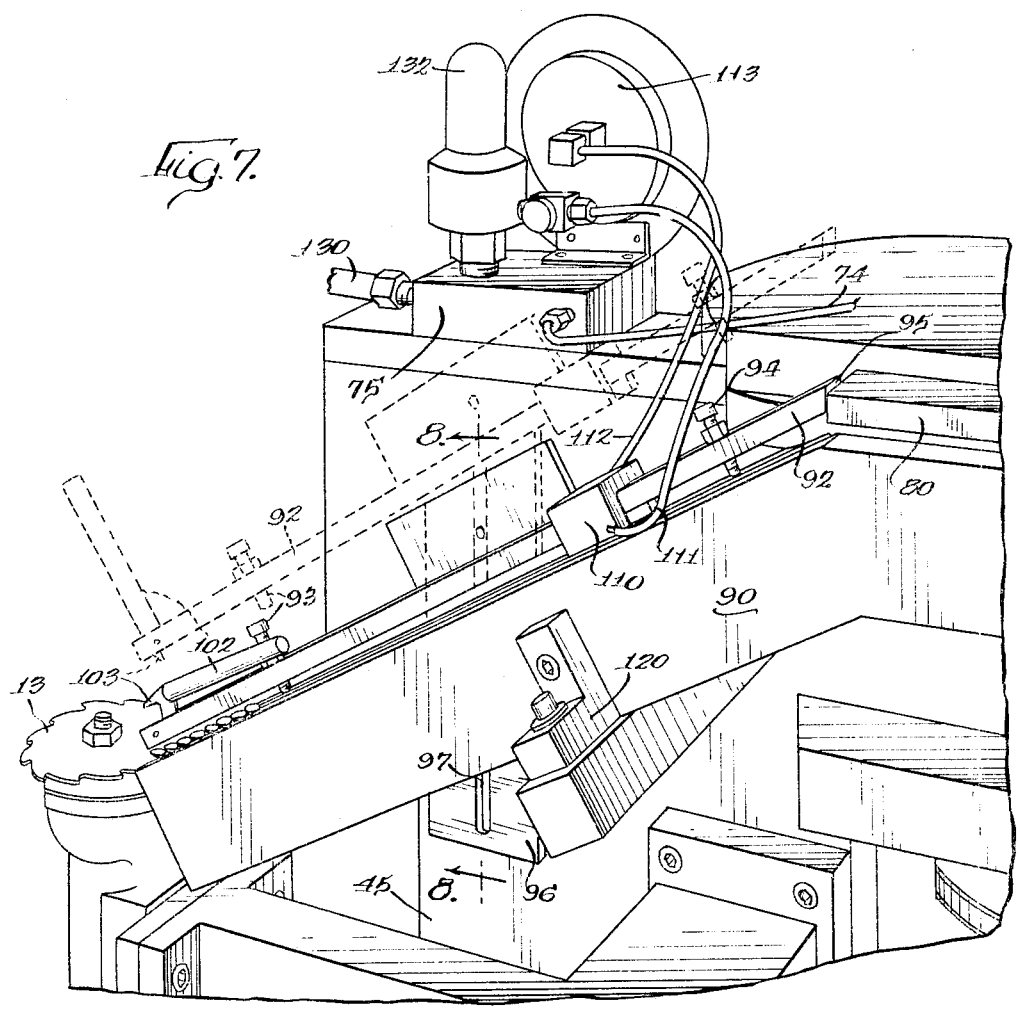

United States Patent Office 3,229,804
Patented Jan. 18, 1966

3,229,804
LOADER AND FEEDER MECHANISM
Axel Anderson, Rockford, Ill., assignor to Sundstrand Corporation, a corporation of Illinois
Filed Apr. 25, 1963, Ser. No. 275,713
14 Claims. (Cl. 198—33)

This invention relates to a high-speed handling mechanism for blanks and more particularly to loader and feeder mechanism for supplying blanks such as screw blanks to a machine tool.

An object of this invention is to provide a new and improved loader and feeder mechanism.

Another object of this invention is to provide a new and improved loader and feeder mechanism in which an elevating conveyor carries blanks from a storage bin to an elevated discharge position with the conveyor being constructed of generally U-shaped stirrup links passing through a self clearing opening in the storage bin and passing about a drive pulley having flats shaped to correspond to the flat sections of successive links and with the conveyor being mounted to provide slack whereby a jam in the conveyor will result in relative movement of the drive pulley and conveyor.

Another object of the invention is to provide loader and feeder mechanism in which the blanks are supported in a storage and feeding channel disposed along an incline for gravity movement of the blanks to a release position, a blank passage communicating with said channel and having blank orienting means associated with the passage including a traveling belt and a driven roller which assists in orienting the blanks for positioning in the passage and channel with support of the blanks by the heads thereof, means for supplying blanks to be oriented along a line which is in line with the passage to have the blanks traveling lengthwise generally in the direction of the belt to facilitate rapid seating of the blanks in the passage, and means disposed alongside the passage engageable with improperly seated blanks to discharge such blanks from the passage.

Another object of the invention is to provide loader and feeder mechanism as defined in the preceding paragraph having means for returning defective blanks back to a storage bin and means for bypassing blanks being directed to the orienting location back to the storage bin when the channel is fully supplied with blanks.

Still another object of the invention is to provide loader and feeder mechanism having a blank guiding and storing channel formed by spaced apart side walls disposed in an inclined position to provide for gravity advance for blanks therealong, a passage connected with said channel and with blanks being oriented in said passage prior to passage to said channel, belt means associated with the passage for advancing blanks therealong and for exerting force through successive blanks to assist in movement of blanks along the channel, and first and second hold down plates positioned over the passage and channel, respectively, to prevent movement of a blank upwardly out of either the passage and channel.

A further object of the invention is to provide loader and feeder mechanism as defined in the preceding paragraph in which the hold down plates are readily adjusted for handling blanks with different height heads by means of adjusting screws and the plates are mounted for quick release to have quick access for release of a blank jam without modifying the position of the height adjusting means and parts of said passage and channel are adjustable with respect to the other parts thereof to provide for handling blanks having a different shank size.

Further objects and advantages will become apparent from the following detailed description taken in connection with the accompanying drawings, in which:

FIG. 1 is a front elevational view of the loader and feeder mechanism;

FIG. 2 is a vertical section on an enlarged scale of a part of the loader mechanism and taken generally along the line 2—2 in FIG. 1;

FIG. 3 is a fragmentary perspective view of the loading container and associated chute means;

FIG. 4 is a fragmentary plan view of the mechanism shown in FIG. 1 and with the belt cover removed;

FIG. 5 is a vertical section taken generally along the line 5—5 in FIG. 4;

FIG. 6 is a perspective view of the feeding mechanism;

FIG. 7 is a perspective view of the final part of the feeding mechanism and showing parts thereof in both full line and broken line position;

FIG. 8 is a fragmentary vertical section taken generally along the line 8—8 in FIG. 7;

FIG. 9 is a fragmentary vertical section taken generally along the line 9—9 in FIG. 6; and FIG. 10 is a fragmentary plan view of alignment mechanism.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The loader and feeder mechanism is shown generally in FIG. 1 in which the loader mechanism is at the right-hand end thereof and indicated generally at 10 and the feeder mechanism is indicated generally at 11. This loader and feeder mechanism functions to carry blanks such as screw blanks having heads and shanks from a storage bin 12 at a high volume rate and deliver the blanks to the feeder mechanism where the blanks are oriented and delivered to an index wheel 13 which receives the blanks one after the other. The wheel 13 passes the blanks on to a suitable mechanism such as a slotting device in the form of a rotary broach such as disclosed in the application of Charles O. Lofgren and Axel Anderson, United States patent application Serial No. 142,088, filed October 2, 1961.

The storage bin is formed as part of a casing 15 and has a bottom formed of sloped panels 16, 17 and 18 into which blanks may be dumped for use. A front panel 19 of the cabinet has a wear plate 20 positioned thereon and an upwardly traveling flight of a conveyor 21 travels along the wear plate 20 for elevating blanks from the bin to an upper discharge location defined by a blank receiving chute 22. The conveyor 21 is endless and is formed of a series of U-shaped or stirrup shaped links 23 having legs 24 and 25 and a base 26. As seen in FIG. 3 the legs 24 and 25 of a link are offset intermediate their length to provide end sections which overlap with the legs of an adjacent link and the lengths are connected together at this location at each side by a flush pin 27. The bottom of chute 22 is sloped from right to left, as viewed in FIG. 3, to provide a constant flow of blanks by the blanks progressively leaving a link 23 from left to right and the following link begins to discharge as the preceding one finishes.

The conveyor 21 passes about a floatingly mounted pulley 30 at the lower end thereof which is carried on an arm 31 pivoted at 32 to the cabinet with the weight of this mechanism functioning to maintain the conveyor fairly taut. The upper end of the conveyor passes about a drive pulley 33 which is driven by a motor 34 through a variable speed drive and the pulley is provided within the peripheral flanges with a pair of shoulders having flats 35 thereon with the length of the flats corresponding generally to the exposed length of a link as shown at the upper end of FIG. 2. Specifically, the shoulders of the pulley 33 have six flats to form driving engagement with the links. In the event that a jam should occur and the conveyor is not free to move with the drive pulley 33, the conveyor may slip relative to the pulley flats 35 as permitted by the floating mounting of the lower conveyor pulley 30.

As seen in FIG. 2, the downwardly traveling section of the conveyor passes within the cabinet 15 behind the cover plate 19 and then in passing around pulley 30 moves up through an opening in the bottom of the storage bin 12. In order to have the conveyor self clearing, a block 36 is mounted on the cabinet beneath the bin panel 16 to define a four-sided open chamber through which the conveyor 21 passes with the base 26 of succeeding conveyor links forming the bottom of the chamber to prevent blanks moving beneath the bin. The length of the block 36 is greater than the space between adjacent conveyor link bases 26 so as to make certain that a base 26 is within the chamber prior to the preceding link base having left the chamber.

In the event that blanks should be carried around pulley 33, an auxiliary chute 38 is positioned within the cabinet 15 having an outlet opening 39 in the side wall 40 of the cabinet whereby blanks falling into the chute may travel back to the storage bin as subsequently to be described. A roller 41 is positioned to angle the conveyor chain to a position to have blanks fall from the conveyor into the chute 38.

The feeder mechanism is connected to the cabinet 15 and supported by a post 45 defining a frame. A chute 46 connects with the previously referred to blank receiving chute 22 and is sloped downwardly to direct blanks into mechanism to be described.

A blank receiving passage is defined by a section 47 of an endless belt 48 and a guide plate 49 (FIG. 5). The endless belt passes about pulleys 50 and 51. The pulley 51 is driven by a motor 52 having a pulley 53 which drives a belt 54 passing about a pulley 55. The pulley 53 is of the variable speed type. Rotation of a knob 56 from the front of the machine provides for lengthwise adjustment (FIG. 1) of a shaft 57 abutting a motor mounting plate 58 pivoted to the frame at 59 to vary the distance between pulleys 53 and 55 to provide for variable speed drive of the pulley 55. The pulley 55 drives its mounting shaft through a slip clutch to provide for a slip in the drive if the belt 48 should jam. The drive to the belt pulley 51 is transmitted from the mounting shaft for pulley 55 through interconnecting gearing (not shown). The belt 48 is disposed with its width positioned vertically so that a blank is positioned in the passage defined by the belt section 47 and the guide plate 49 with the shank thereof between these parts and the head of the blank resting on the belt edge and the upper edge of the guide plate 49. The belt 48 travels in the direction shown by the arrow shown in FIG. 4 to provide for advance of blanks along the passage. The chute 46 is positioned to direct blanks toward the passage traveling in a direction generally along the length of belt travel to facilitate quick orientation of the blanks in the passage. This orientation is further facilitated by a driven roller 60 positioned to the rear of the guide plate 49. This roller is driven by means of a motor 61 through a belt drive 61a and has a raised spiral surface 62. This roller rotates in the direction shown by the arrow in FIG. 5 and tends to tumble blanks which have not immediately seated in the passage to facilitate their orientation in the passage. The raised spiral surface 62 tends to assist in advancing blanks along the length of the passage.

A hopper is provided beneath the passage having a front wall 63 and a rear wall 64 along with a sloped bottom 65 which leads to a sloped surface 66 on the front of the cabinet 15 overlying the storage bin 12 whereby blanks which are not positioned in the passage can return to the storage bin 12 for re-circulation. A movable continuation of the front wall 63 is provided by a swingable plate 67 which is pivoted about a pin 68. The plate can be moved to provide easier access to the blank passage. A container 69 or containers (FIG. 5) can be mounted beneath the passage to receive blank rejects not having heads and which therefore do not remain in the passage.

A back plate 70 is mounted on top of a frame member 71 along which the belt section 47 travels to provide only a narrow ledge on top of the frame member 71 to prevent blanks from resting on top of the frame member.

The feeding rate of blanks is determined primarily by the speed of belt 48 and the speed of the elevating conveyor 21. It is necessary to have the speed of the belt 48 such that it will carry blanks rapidly away from the orienting location of the passage so that additional blanks coming down the chute 46 will have space in the passage in which to fall. Assistance in orienting the blanks can be obtained by use of an air blast supplied through a nozzle 72 formed in an extension 73 of a cover plate shown in broken lines in FIG. 6 for the chute 46 with the nozzle being supplied with air through a line 74 which connects to an air manifold 75, as shown in FIG. 7.

Blanks are moved from the orienting position along the passage by travel of the belt section 47 and if any blanks are improperly oriented, they are deflected away from the passage for return to the storage bin by a pair of deflecting plates 76 and 77. These deflecting plates will engage under the head of a blank which is not fully seated in the passage and cam it upwardly out of the passage for return to the storage bin. Each of these plates can be adjusted lengthwise along the passage by mounting thereof by the attaching bolt 78 in any of the holes 79 formed in the guide plate 49 and also the frame plate 71.

A first hold down plate overlies the terminal end of the passage and is indicated at 80 adjacent a cover for the belt 48. The hold down plate has a leading end 81 with an inclined surface 82 for camming downwardly and fully seating any blank by engagement with the head thereof. The vertical position of the hold down plate 80 relative to the passage can be adjusted by the positioning of a pair of threaded bolts 83 and 84 which are threaded in the hold down plate and extend beneath to engage the top surface of the frame plate 71 and thus can accommodate the passage height for the corresponding height of blank heads. In the event there should be a jam in the passage beneath the hold down plate 80, the plate can quickly be moved from the operating position shown in full line to the release position shown in broken line for access to the passage. This is accomplished by unscrewing a shaft 85 threaded in a block 86 and raising of the hold down plate 80 to position an enlarged opening 87 of a diameter the same as the shaft 85 in alignment with the shaft for movement of the guide plate 80 toward the right as viewed in FIG. 6. This quick release does not affect the height adjustment since the bolts 83 and 84 are mounted in the hold down plate 80 and merely engage against the top of the frame plate 71.

An inclined channel extends from the passage to the index wheel 13 and comprises a pair of side plates 90 and 91 as shown in FIG. 8 which are spaced apart to define the channel. The plates 90 and 91 are inclined downwardly to the index wheel 13 whereby blanks can advance by gravity down the channel and also by being advanced by the push of the blanks to the rear thereof.

A second hold down plate 92 overlies the channel and the distance from the channel can be adjusted by rotation of the threaded bolts 93 and 94 carried in the hold down plate and which engage the upper surface of the side plate 91 of the channel. The front end of the hold down plate 92 is formed at an angle to the length thereof as indicated at 95 and the hold down plate can move from a full-line position to the broken line position along a line parallel to the face of the front end 95 so that in all height positions of adjustment for the hold down plate, it will be in closely abutting relation with the first hold down plate 80 for the passage to form a continuous hold down surface. This adjustment is accomplished by a plate 96 secured to the hold down plate 92 with the plate 96 having an elongate slot 97 movably mounted on a pair of bolts 98 and 99 threaded into the side plate 91 of the channel. A spring 100 about bolt 99 provides a frictional grip on the plate 96 and the plate 96 can be locked in adjusted position determined by the bolts 93 and 94 by tightening of the bolt 98 which has an oversized end of a diameter greater than the width of the slot to be tightened down on the plate 96.

When it is desired to prevent further passage of blanks from the channel a handle 102 can be pivoted counterclockwise as is shown in FIG. 7 to a generally vertical position to place an end 103 in the channel and block the passage of blanks from the channel. This position of the handle is shown in the broken line showing the hold down plate 92 in released position.

With certain sized blanks it is desired to control the supply of blanks to the feeder from the loading mechanism by demand responsive means. This means comprises a pneumatic detector 110 (FIGS. 6 and 7) in which an air line 111 directs an air blast across the channel and if there are no blanks present this air goes to a line 112 connected to a pressure responsive diaphragm 113, and the loader is free to deliver blanks to the feeding mechanism. If blanks are present, air does not get to the line 112 and the diaphragm 113 is positioned to operate a switch (not shown) which is in circuit with a solenoid 114 (FIG. 6).

The solenoid is associated with a baffle 115 positioned in the chute 46. As shown in FIG. 6, the solenoid is not energized and the baffle 115, which is in the form of a steel spring plate, is adjacent the wall of the chute and accurately positioned by an adjustable threaded member 116 to have blanks guided down into the passage between the belt and roller. When the pneumatic detector 110 detects the presence of blanks in the channel at the location of the detector and the solenoid 114 is thus energized, the plunger thereof extends to swing the baffle 115 toward the left as viewed in FIG. 6 and lead blanks to the rear of the passage whereby blanks will pass down into the hopper beneath and back into the storage bin 12 in the manner previously described.

In addition to the speed adjustments of the belt 48 and the elevating conveyor 21 and the height adjustments of the hold down plates 80 and 92, there are lateral adjustments for determining the width of the passage and the channel. These adjustments are obtained by adjusting the guide plate 49 of the passage relative to the frame plate 71 and the side plate 90 of the channel relative to the side plate 91. These adjustments are provided by adjustable mechanism shown at 121 (FIG. 6) and 120, 123 and 124, shown in FIG. 4.

The air for the mechanism is received through a line 130 connected to the manifold block 75 and a pressure reducing valve 132 is connected into the block and into the line 111 which supplies the pneumatic detector 110. This block also supplies the line 74 which leads to the nozzle 72 for assisting in seating of the blanks in the blank passage.

Mechanism, as shown more particularly in FIGS. 4 and 10, is provided to obtain proper alignment of a hex head blank in order to make certain that the slot is cut across flats of the head.

As shown in FIGS. 4 and 10, the index wheel 13 is associated with the feeding drum 150 which carries a series of blank clamp members as more particularly described in the previously referred to application of C. O. Lofgren and Axel Anderson. This drum 150 passes by the index wheel 13. In order to properly align a hex head blank, a spring blade member 151 is mounted at an end to the block 152 and extends to a position overlying the index wheel 13. A curved piece 153 is bent outward from the blade 151 to assist in guiding parts from the index wheel 13 into pockets on the drum 150. Additionally, a terminal end of the spring blade member has a cam surface 154 for engaging a flat of the hex head blank 155 and aligning the blank as it is positively gripped by the drum 150. The drum 150 in its rotation carries the blank past the cam surface and the cam surface can move out of the way due to the flexibility of the blade member 151. With this structure, a blank is caused to travel past the broaching station with the slot being cut normal to two flats thereon.

It will be seen from the foregoing description that a loading and feeding mechanism has been provided for orienting and supplying blanks at a high rate of speed. In an actual device of the type disclosed in the drawings, many different sizes of blanks have been fed at rates ranging from 900 to 1200 pieces per minute with there having been at least one run of a particular type of blank at a rate of 2200 pieces per minute.

I claim:

1. A loader and feeder mechanism for blanks having a shank and a head comprising, a feeding and storage channel for the blanks including side walls between which the blank shanks are located in position with the blank heads resting on said side walls, means for orienting blanks into said position including a roller with a raised spiral surface, means for advancing blanks along said channel including a driven belt spaced from said roller, means for directing blanks toward said roller including an inclined chute extending generally in line with said roller and channel, and means for continuously supplying blanks to said chute.

2. A loader and feeder mechanism as defined in claim 1 in which said channel has a guide plate positioned thereabove to prevent movement of blanks upwardly out of said channel.

3. A loader and feeder mechanism as defined in claim 2 in which said guide plate has means for adjusting the distance of said guide plate from the channel for different size blank heads, and means for adjusting said channel side walls relative to each other for different size blank shanks.

4. A loader and feeder mechanism for blanks having a head and a shank comprising, a frame, an endless belt traveling along a path, a guide plate spaced from the belt and defining with a belt a passage for blanks, a roller positioned behind said guide plate and having a spiral raised surface for tumbling blanks above said passage, means for rotating the roller in a direction to displace improperly seated blanks and have the spiral surface assist in advancing blanks, a downwardly inclined channel extending from said passage and defined by spaced apart side walls, a first blank hold down plate overlying the exit end of said passage and having a tapered entry end to assist in seating the blanks in said passage, means for adjusting the vertical position of said first hold down plate dependent on the height of the blank heads, quick release means for said first hold down plate for movement thereof to clear a jam, a second blank hold down plate overlying said channel and having an end adjacent said first hold down plate to form a continuous closed top for said passage and channel, means for adjusting the position of the second hold down plate relative to the channel, and quick release means for said second hold down plate for movement thereof to clear a jam.

5. A loader and feeder mechanism as defined in claim 4 in which the adjusting means for said first and second hold down plates comprises bolts threaded therein and loosely abutting against a part of the frame and channel side wall respectively to not interfere with quick release movement of said hold down plates.

6. A loader and feeder mechanism as defined in claim 4 including deflector plates mounted along said passage ahead of said first hold down plate for deflecting improperly seated blanks from said passage.

7. A loader and feeder mechanism as defined in claim 6 including containers mounted on said frame beneath said passage to catch blank rejects falling thereinto.

8. A loader and feeder mechanism as defined in claim 4 including demand responsive means for supplying blanks to said roller and belt.

9. A loader and feeder mechanism as defined in claim 4 including chute means for supplying blanks to said roller and belt with the blanks leaving the chute traveling in a direction lengthwise of the belt.

10. A loader and feeder mechanism as defined in claim 9 including means for directing air onto said blanks to assist seating thereof between the belt and roller.

11. A loader and feeder mechanism for blanks having a shank and a head comprising, a feeding and storage channel for the blanks including side walls between which the blank shanks are located in position with the blank heads resting on said side walls, means for orienting blanks into said position including a roller with a raised spiral surface, means for advancing blanks along said channel including a driven belt spaced from said roller, means for directing blanks toward said roller including a chute, means for continuously supplying blanks to said chute, means for detecting the presence of blanks in said channel, and baffle means responsive to operation of said detecting means to direct blanks away from said blank orienting means.

12. A loader and feeder mechanism as defined in claim 11, including deflector plates above said driven belt for deflecting improperly seated blanks away from said belt.

13. A loader and feeder mechanism as defined in claim 11, wherein said chute is in line with said roller and belt to have blanks leave said chute traveling lengthwise of the belt and roller.

14. A loader and feeder mechanism as defined in claim 11, including means for directing air onto said blanks to assist in seating thereof between the belt and the roller.

References Cited by the Examiner
UNITED STATES PATENTS

| | | | |
|---|---|---|---|
| 398,651 | 2/1889 | Peters | 198—33 |
| 866,619 | 9/1907 | Bushnell | 198—55 |
| 2,026,794 | 1/1936 | Neighbour | 198—55 |
| 2,840,221 | 6/1958 | Carroll | 198—33 |
| 2,976,978 | 3/1961 | Huller | 198—33 |
| 3,044,660 | 7/1962 | Troll | 198—33 |

SAMUEL F. COLEMAN, *Primary Examiner.*

WILLIAM B. LA BORDE, *Examiner.*